(12) United States Patent
Choi et al.

(10) Patent No.: US 10,170,802 B2
(45) Date of Patent: Jan. 1, 2019

(54) BATTERY PACK HAVING PCM CASE

(71) Applicant: LG CHEM, LTD., Seoul (KR)

(72) Inventors: Mi Geum Choi, Daejeon (KR); Hyung Ku Yun, Daejeon (KR); Dong Cheol Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 200 days.

(21) Appl. No.: 15/023,941

(22) PCT Filed: Sep. 26, 2014

(86) PCT No.: PCT/KR2014/008996
§ 371 (c)(1),
(2) Date: Mar. 22, 2016

(87) PCT Pub. No.: WO2015/046935
PCT Pub. Date: Apr. 2, 2015

(65) Prior Publication Data
US 2016/0218402 A1    Jul. 28, 2016

(30) Foreign Application Priority Data

Sep. 27, 2013  (KR) .................. 10-2013-0115148

(51) Int. Cl.
*H01M 10/42* (2006.01)
*H01M 10/0585* (2010.01)
(Continued)

(52) U.S. Cl.
CPC ..... *H01M 10/4257* (2013.01); *H01M 2/0212* (2013.01); *H01M 2/0404* (2013.01);
(Continued)

(58) Field of Classification Search
CPC combination set(s) only.
See application file for complete search history.

(56) References Cited

U.S. PATENT DOCUMENTS

2005/0181242 A1   8/2005  Suzuki et al.
2006/0244416 A1*  11/2006 Yong .................. H01M 2/0215
                                                       320/112
(Continued)

FOREIGN PATENT DOCUMENTS

EP       1 309 020 A2    5/2003
JP       2005-166644 A   6/2005
(Continued)

OTHER PUBLICATIONS

International Search Report, issued in PCT/KR2014/008996, dated Jan. 9, 2015.

*Primary Examiner* — Kaity V Chandler
(74) *Attorney, Agent, or Firm* — Birch, Stewart, Kolasch & Birch, LLP (57) ABSTRACT

Disclosed herein is a battery pack configured to have a structure including a plate-shaped battery cell having electrode terminals formed at one side thereof including a sealed surplus part and a protection circuit module (PCM) mounted at the sealed surplus part, wherein each of the electrode terminals of the battery cell is made of a plate-shaped conductive member, the PCM includes a protection circuit board (PCB), a safety element electrically connected between one of the electrode terminals formed at one side of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case is configured to have a structure in which two outer surfaces of the module case are open outward to form a first open surface and a second open surface, the module case is provided at an interior thereof with a PCB receiving part, and the PCM is loaded on the sealed surplus part of the battery cell in a state
(Continued)

in which the PCM is received in the module case such that the PCM is electrically connected to the electrode terminals of the battery cell.

16 Claims, 5 Drawing Sheets

(51) Int. Cl.
    *H01M 2/34*     (2006.01)
    *H01M 10/0525*     (2010.01)
    *H01M 2/30*     (2006.01)
    *H01M 2/02*     (2006.01)
    *H01M 2/10*     (2006.01)
    *H01M 2/04*     (2006.01)

(52) U.S. Cl.
    CPC ........... *H01M 2/1061* (2013.01); *H01M 2/30* (2013.01); *H01M 2/34* (2013.01); *H01M 2/348* (2013.01); *H01M 10/0525* (2013.01); *H01M 10/0585* (2013.01); *H01M 10/425* (2013.01); *H01M 2200/00* (2013.01); *H01M 2200/10* (2013.01); *H01M 2220/30* (2013.01)

(56) References Cited

U.S. PATENT DOCUMENTS

| | | | | |
|---|---|---|---|---|
| 2006/0257731 A1* | 11/2006 | Yoon | ..................... | H01M 2/021 429/176 |
| 2009/0098417 A1 | 4/2009 | Yamada et al. | | |
| 2009/0117412 A1* | 5/2009 | Koh | ..................... | H01M 2/0473 429/7 |
| 2009/0155631 A1* | 6/2009 | Baek | ..................... | H01M 2/0207 429/7 |
| 2010/0196745 A1* | 8/2010 | Ahn | ..................... | H01M 2/0207 429/7 |
| 2010/0323225 A1* | 12/2010 | Lee | ..................... | H01M 2/0215 429/7 |
| 2011/0039128 A1* | 2/2011 | Baek | ........................ | H01M 2/02 429/7 |
| 2011/0064972 A1* | 3/2011 | Park | ..................... | H01M 2/0408 429/7 |
| 2011/0064975 A1* | 3/2011 | Koh | ..................... | H01M 2/0404 429/7 |
| 2011/0070466 A1* | 3/2011 | Park | ........................ | H01M 2/30 429/7 |
| 2011/0210954 A1* | 9/2011 | Murphy | ............ | H01M 10/0525 345/211 |
| 2011/0250474 A1* | 10/2011 | Baek | ..................... | H01M 2/021 429/7 |
| 2011/0300412 A1* | 12/2011 | Koh | ..................... | H01M 2/0215 429/7 |
| 2011/0300414 A1* | 12/2011 | Baek | ..................... | H01M 2/0426 429/7 |
| 2012/0052333 A1* | 3/2012 | Baek | ..................... | H01M 2/0404 429/7 |
| 2012/0121936 A1* | 5/2012 | Baek | ..................... | H01M 10/42 429/7 |
| 2012/0301748 A1* | 11/2012 | Choi | ..................... | H01M 2/0486 429/7 |
| 2013/0034750 A1* | 2/2013 | Choi | ..................... | H01M 10/058 429/7 |
| 2013/0040170 A1 | 2/2013 | Choi et al. | | |
| 2013/0115481 A1* | 5/2013 | Kim | ..................... | H01M 2/0217 429/7 |
| 2013/0122329 A1 | 5/2013 | Park et al. | | |
| 2013/0196226 A1* | 8/2013 | Lee | ........................ | H01M 4/02 429/211 |
| 2013/0280558 A1* | 10/2013 | Hur | ..................... | H01M 2/0285 429/7 |
| 2014/0141289 A1 | 5/2014 | Choi et al. | | |
| 2014/0147707 A1* | 5/2014 | Choi | ..................... | H01M 10/04 429/7 |
| 2014/0227586 A1* | 8/2014 | Byun | ................. | H01M 2/0217 429/179 |
| 2014/0292284 A1* | 10/2014 | Sawada | ............. | H01M 10/0587 320/167 |
| 2014/0377591 A1* | 12/2014 | Cho | ..................... | H01M 2/1061 429/7 |
| 2015/0004441 A1 | 1/2015 | Jeong et al. | | |
| 2016/0149193 A1* | 5/2016 | Seong | ............... | H01M 10/0431 429/179 |
| 2016/0233479 A1* | 8/2016 | Ahn | ........................ | H01M 2/34 |
| 2016/0233554 A1* | 8/2016 | Choi | ..................... | H01M 2/1061 |

FOREIGN PATENT DOCUMENTS

| | | |
|---|---|---|
| JP | 2009-99320 A | 5/2009 |
| JP | 2010-182598 A | 8/2010 |
| JP | 2011-70906 A | 4/2011 |
| JP | 2013-41810 A | 2/2013 |
| KR | 10-2011-0066774 A | 6/2011 |
| KR | 10-227870 B1 | 1/2013 |
| KR | 10-2013-0018577 A | 2/2013 |
| KR | 10-2013-0044821 A | 5/2013 |
| TW | I482335 B | 4/2015 |

* cited by examiner

BATTERY PACK HAVING PCM CASE

TECHNICAL FIELD

The present invention relates to a battery pack configured to have a structure in which a protection circuit module (PCM) is mounted at a sealed surplus part of a plate-shaped battery cell at which electrode terminals are formed, wherein the PCM includes a protection circuit board (PCB), a safety element, an external input and output terminal, and an electrically insulative module case in which the PCB and the safety element are mounted in a state in which the external input and output terminal extends outside, the module case is configured to have a structure in which two outer surfaces of the module case are open outward to form a first open surface and a second open surface, the module case is provided at an interior thereof with a PCB receiving part, and the PCM is loaded on the sealed surplus part of the battery cell in a state in which the PCM is received in the module case such that the PCM is electrically connected to the electrode terminals of the battery cell.

BACKGROUND ART

A secondary battery represented by a lithium secondary battery exhibiting high energy density and operating voltage and excellent charge retention and service-life characteristics has been widely used as an energy source for various electronic products as well as various mobile devices.

Depending upon the kind of an external device in which a secondary battery is used, the secondary battery may be configured to have a detachable type structure in which the secondary battery can be easily inserted into and removed from the external device or to have an embedded type structure in which the secondary battery is embedded in the external device. For example, the secondary battery can be inserted or removed into or from devices, such as laptop computers, as needed. On the other hand, devices, such as some kinds of mobile phones, require an embedded type battery pack due to the structure or capacity thereof.

Meanwhile, various kinds of combustible materials are contained in the lithium secondary battery. As a result, the lithium secondary battery may be heated or explode due to the overcharge of the lithium secondary battery, the overcurrent in the lithium secondary battery, or other external physical impact applied to the lithium secondary battery. That is, the safety of the lithium secondary battery is very low. For this reason, safety elements, such as a positive temperature coefficient (PTC) element and a protection circuit module (PCM), which are capable of effectively controlling an abnormal state of the lithium secondary battery, such as the overcharge of the lithium secondary battery or the overcurrent in the lithium secondary battery, are connected to a battery cell of the lithium secondary battery.

In general, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a flexible printed circuit board (F-PCB) is attached to one side of a double-sided adhesive tape, a protective tape is attached to the other side of the double-sided adhesive tape, and electrode tabs of the F-PCB and the nickel plates are connected to each other by welding in a state in which the F-PCB is in tight contact with the battery cell. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a portion of a sealed part of a battery case, in which the battery cell is received, is bent, and an insulative tape is attached thereto or a barcode is printed thereon. That is, the process is very complicated.

Since a plurality of insulative tapes or parts is required to achieve safe connection as described above, a battery pack assembly process is complicated and manufacturing cost of the battery pack is increased.

In addition, when external impact is applied to the battery pack, the PCM may be damaged or dimensional stability of the battery pack may be greatly lowered due to the use of the insulative tapes, which exhibit low mechanical strength.

Therefore, there is a high necessity for a technology that is capable of reducing the number of members mounted to the battery cell to simplify an assembly process, achieving stable coupling between members loaded on the battery cell, and protecting the PCM.

DISCLOSURE

Technical Problem

Therefore, the present invention has been made to solve the above problems, and other technical problems that have yet to be resolved.

Specifically, it is an object of the present invention to provide a battery pack wherein the number of parts necessary to manufacture the battery pack is reduced, thereby simplifying an assembly process, and structural stability of the battery pack is improved.

It is another object of the present invention to provide a battery pack including a module case having a specific structure configured to provide higher electric capacity than other different battery packs having the same standard while having a compact structure.

Technical Solution

In accordance with one aspect of the present invention, the above and other objects can be accomplished by the provision of a battery pack configured to have a structure including a plate-shaped battery cell having electrode terminals formed at one side thereof including a sealed surplus part and a protection circuit module (PCM) mounted at the sealed surplus part, wherein each of the electrode terminals of the battery cell is made of a plate-shaped conductive member, the PCM includes a protection circuit board (PCB), a safety element electrically connected between one of the electrode terminals formed at one side of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case is configured to have a structure in which two outer surfaces of the module case are open outward to form a first open surface and a second open surface, the module case is provided at an interior thereof with a PCB receiving part, and the PCM is loaded on the sealed surplus part of the battery cell in a state in which the PCM is received in the module case such that the PCM is electrically connected to the electrode terminals of the battery cell.

Consequently, the battery pack according to the present invention is based on the structure of the module case including the first open surface and the second open surface, which are open outward, and the PCB receiving part defined therein and which is loaded on the sealed surplus part of the battery cell in a state in which the PCB is received in the PCB receiving part, whereby it is possible to reduce the number of parts constituting the battery pack and to simplify the coupling structure of the battery pack, thereby improving manufacturing processability and stability of the battery pack.

In addition, the module case having the specific structure as described above is applied to the battery pack according to the present invention. Consequently, it is possible to provide higher electric capacity than other different battery packs having the same standard while having a compact structure.

In a concrete example, the plate-shaped battery cell may be a pouch-shaped secondary battery.

Specifically, the pouch-shaped secondary battery may be configured to have a structure in which an electrode assembly is received in a battery case made of a laminate sheet including a resin layer and a metal layer in a sealed state. The electrode assembly may be configured to have a structure including a cathode, an anode, and a separator disposed between the cathode and the anode and may be received in the battery case together with an electrolyte in a sealed state.

The secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

In the present invention, the sealed surplus part means an upper end sealed part formed when the battery case is thermally bonded in a sealed state.

Specifically, a sealed part having a surplus space formed at one of the sealed outer circumferences of the battery case formed when the electrode assembly is disposed in the battery case made of the laminate sheet in a sealed state is referred to as a sealed surplus part. However, the sealed surplus portion may be replaced by terms, such as a thermally bonded surplus part and a sealed terrace, as long as the specified terms have the same meaning as the sealed surplus part.

In a concrete example, the safety element may be an element to effectively control an abnormal state of the anode and cathode terminals electrically connected to a device in which the battery pack is mounted and an abnormal state of the battery pack, such as the overcharge of the battery pack or the overcurrent in the battery pack. Examples of the safety element may include a positive temperature coefficient (PTC) element, a fuse, and a thermal cutoff or cutout (TCO).

The form of the external input and output terminal is not particularly restricted so long as the external input and output terminal can be electrically connected to the PCB to supply electric current from an external device, such as a charger, to the battery cell or to supply electric current from the battery cell to a device, such as a mobile phone. In an embedded type battery pack, the external input and output terminal may be configured in the form of a plate or a wire.

In a concrete example, the module case may be configured to have a tunnel structure in which the first open surface and the second open surface communicate with each other in a straight line. The first open surface or the second open surface may be oriented toward the electrode assembly of the battery cell in a state in which the module case is loaded on the sealed surplus part of the battery cell.

In the module case with the above-stated construction, the first open surface and the second open surface are symmetric. Consequently, it is possible to easily mount the PCB in the module case through the first open surface or the second open surface. In addition, the module case is configured to have a tunnel structure in which the PCB can be mounted in the module case through the first open surface or the second open surface. Consequently, it is not necessary to consider directivity of the module case in mounting the PCB in the PCB receiving part of the module case, thereby improving efficiency of an assembly process and thus improving production efficiency.

In addition, opposite end portions of the module case facing the sealed surplus part of the battery cell may protrude toward the sealed surplus part of the battery cell. Specifically, the protruding length of each of the opposite end portions of the module case may be equal to the protruding height of each electrode terminal sealing part formed at the sealed surplus part of the battery cell. In this structure, therefore, the module case may be stably loaded on the sealed surplus part of the battery cell in a state in which the module case is in tighter contact with the sealed surplus part of the battery cell.

In another concrete example, the module case may be configured to have a rectangular parallelepiped box structure and the module case may be provided at the inside thereof with at least one PCB fixing protrusion part.

As described above, the module case is configured to have a specific structure including the first open surface, the second open surface, the PCB receiving part, and the PCB fixing protrusion part. Consequently, it is possible to easily receive and fix the PCB and the safety element in the PCB receiving part. In addition, the module case is configured to have a structure which does not require an additional fixing member or protection member. Consequently, productivity is improved through a simplified assembly process. Furthermore, the PCB and the safety element are securely and stably fixed by the PCB fixing protrusion part in a state in which the PCB and the safety element are received in the PCB receiving part of the module case such that the PCB and the safety element can be electrically isolated and protected from the outside. Consequently, it is possible to improve overall mechanical strength of the PCM and to greatly reduce the amount of an insulative tape used as compared with a conventional embedded type battery pack.

In addition, the module case including the PCB receiving part having the above structure may be easily loaded on the sealed surplus part of the battery cell since the module case has a rectangular parallelepiped structure, the outer surface of which is smooth.

As a result, the battery pack according to the embodiment of the present invention has a more compact structure than a conventional battery pack. In addition, it is possible to utilize a space occupied by a PCM fixing member or PCM protection members of the conventional battery pack as a space for electrical capacity. Consequently, it is possible to increase electrical capacity of the battery pack having the same standard as the conventional battery pack.

In a further concrete example, the battery pack may further include a label attached to outer surfaces of the PCM and the battery cell excluding the external input and output terminal in a wrapping fashion. Consequently, it is possible to more stably secure electrical connection between the electrode terminals of the battery cell and the PCB while maintaining insulation of the battery cell.

In accordance with another aspect of the present invention, there is provided a protection circuit module (PCM), having a specific structure, which is used to constitute the battery pack with the above-stated construction.

Specifically, there is provided a protection circuit module (PCM) loaded on a sealed surplus part of a plate-shaped battery cell having electrode terminals, each of which is made of a plate-shaped conductive member, formed at an upper end thereof, wherein the PCM includes a PCB, a safety element electrically connected between one of the electrode terminals formed at one side of the battery cell and the PCB or loaded on the PCB, an external input and output terminal electrically connected to a protection circuit of the PCB, and an electrically insulative module case in which the PCB and the safety element are mounted in a state in which the external input and output terminal extends outside, the module case is configured to have a structure in which two outer surfaces of the module case are open outward to form a first open surface and a second open surface, the module case is provided at an interior thereof with a PCB receiving part, and the PCM is loaded on the sealed surplus part of the battery cell in a state in which the PCM is received in the module case such that the PCM is electrically connected to the electrode terminals of the battery cell.

In a general process of assembling an embedded type battery pack, a connection member and an F-PCM are coupled and an insulative tape is attached at each step such that a PCM assembly is mounted on a battery cell. That is, the PCM assembly is mounted to the battery cell using a large number of parts. As a result, a large number of processes are required. In addition, mechanical strength and structural stability of the battery pack are low.

On the other hand, the PCM according to the present invention is configured to have a structure in which the safety element is mounted in the module case in a state in which the safety element is coupled to the PCB. Consequently, structural stability of the battery pack is improved and a process of manufacturing the battery pack is greatly simplified.

In a concrete example, the module case may be configured to have a tunnel structure in which the first open surface and the second open surface communicate with each other in a straight line. The first open surface or the second open surface may be oriented toward the electrode assembly of the battery cell in a state in which the module case is loaded on the sealed surplus part of the battery cell.

In another concrete example, the external input and output terminal may be configured in the form of a plate or a wire in an embedded type battery pack although the form of the external input and output terminal is not particularly restricted so long as the external input and output terminal can be electrically connected to the PCB to supply electric current from a device, such as a charger, to the battery cell or to supply electric current from the battery cell to a device, such as a mobile phone.

The module case may be configured to have a rectangular parallelepiped structure and the module case may be provided at the inside thereof with at least one PCB fixing protrusion part.

In accordance with another aspect of the present invention, there is provided a method of manufacturing the battery pack with the above-stated construction.

Specifically, the method of manufacturing the battery pack includes (a) connecting an external input and output terminal to a PCB by welding or soldering, (b) connecting the PCB to electrode terminals of a battery cell by welding or soldering, (c) mounting the PCB in a PCB receiving part of a module case through a first open surface and a second open surface of the module case, (d) loading the PCM on a sealed surplus part of the battery cell, and (e) attaching a label to outer surfaces of the PCM and the battery cell excluding the external input and output terminal in a wrapping fashion.

In a concrete example, the welding may be spot welding, laser welding, or ultrasonic welding although the welding is not particularly restricted so long as electrical connection is achieved by the welding.

In the manufacturing method according to the present invention, it is possible to reduce the number of manufacturing processes and to provide a battery pack exhibiting improved structural stability as compared with a method of manufacturing a conventional embedded type battery pack.

In accordance with a further aspect of the present invention, there is provided a mobile device including the battery pack with the above-stated construction as a power source.

Concrete examples of the mobile device in which the battery pack according to the present invention can be used may include, but are not limited to, a mobile phone, a laptop computer, a netbook computer, a tablet PC, and a smart pad.

The above-described devices or apparatuses are well known in the art to which the present invention pertains and, therefore, a detailed description will be omitted.

Effects of the Invention

As is apparent from the above description, a battery pack according to the present invention is configured to have a structure in which a module case including a first open surface and a second open surface, which are open outward, and a protection circuit board (PCB) receiving part defined therein and which is loaded on a sealed surplus part of a battery cell in a state in which a PCB is received in the PCB receiving part is applied to the battery pack. Consequently, it is possible to simplify a manufacturing process, thereby improving production efficiency, to improve structural stability, to provide a battery pack having a compact structure, and to provide higher electric capacity than other different battery packs having the same standard.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
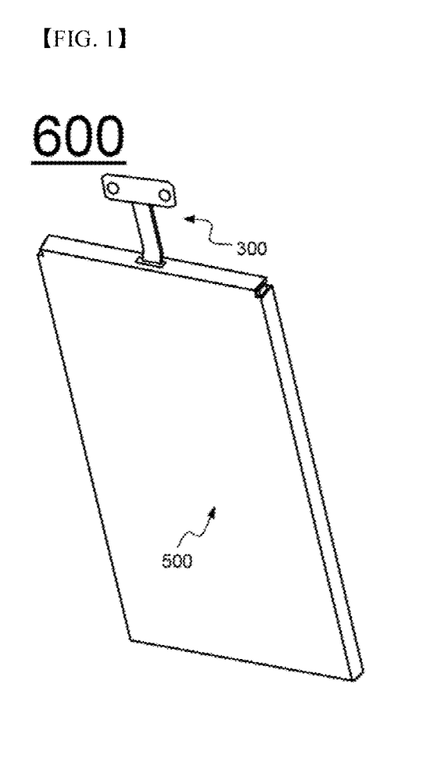
FIG. 1 is a perspective view showing a battery pack according to an embodiment of the present invention.
Figure 2:
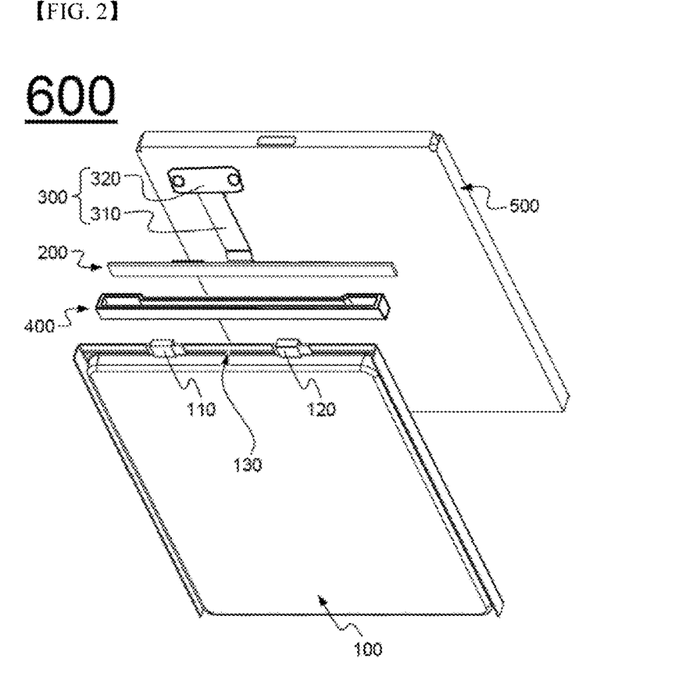
FIG. 2 is an exploded perspective view of the battery pack shown in FIG. 1.

FIG. 1 is a perspective view showing a battery pack according to an embodiment of the present invention and FIG. 2 is an exploded perspective view of the battery pack shown in FIG. 1. In addition, FIG. 9 is a perspective view showing a module case according to an embodiment of the present invention.

Referring to these drawings, a battery pack 600 includes a plate-shaped battery cell 100 having electrode terminals 110 and 120 formed at a sealed surplus part 130 provided at one side thereof and an electrically insulative module case 400 for receiving a protection circuit board (PCB) 200. The plate-shaped battery cell 100 and the module case 400 are wrapped by a protection label 500.

In addition, the PCB is electrically connected to a connection part 310 of a plate-shaped external input and output terminal 300. The external input and output terminal 300 extends outward from the module case 400. A connector 320 configured to be connected to an external device is formed at one end of the external input and output terminal 300.

Figure 9:
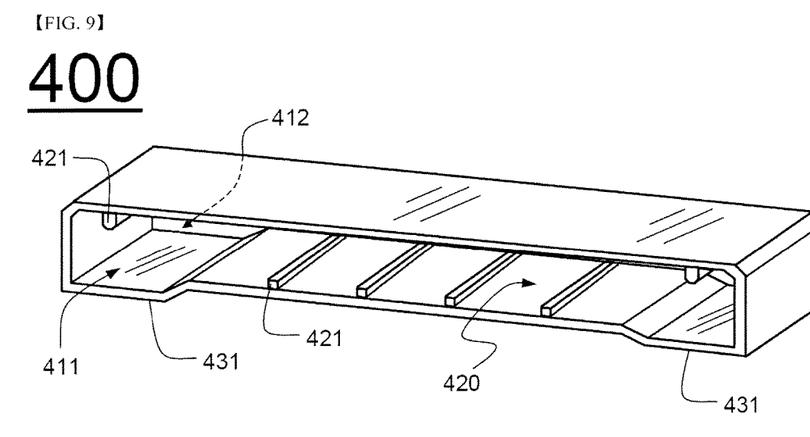
FIG. 9 is a perspective view showing a module case according to an embodiment of the present invention.

As shown in FIG. 9, on the other hand, the module case 400 is configured to have a tunnel structure including a first open surface 411 and a second open surface 412 formed at opposite sides of the module case 400 in a state in which the first open surface 411 and the second open surface 412 are open outward such that the opposite sides of the module case 400 communicate with each other in a straight line. In addition, the first open surface 411 and the second open surface 412 of the module case 400 are symmetric.

FIGS. 3 to 8 are perspective views showing a process of manufacturing a battery pack according to an embodiment of the present invention.

Figure 3:
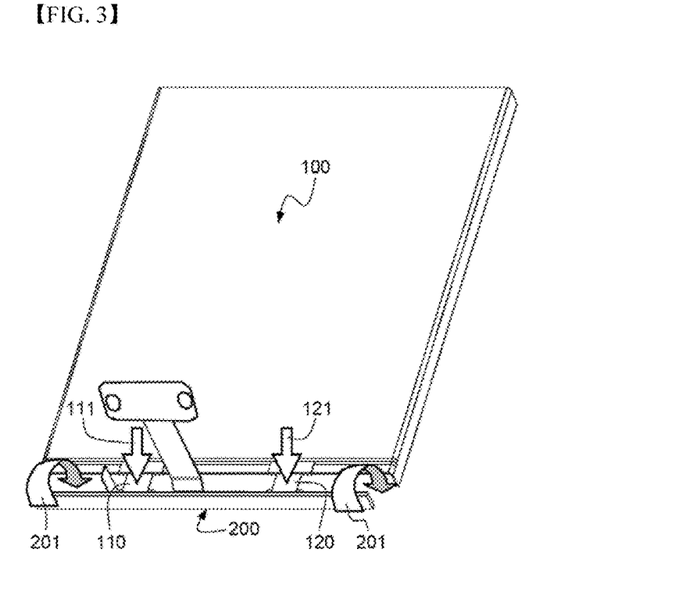
FIGS. 3 to 8 are perspective views showing a process of manufacturing a battery pack according to an embodiment of the present invention.
Figure 4:
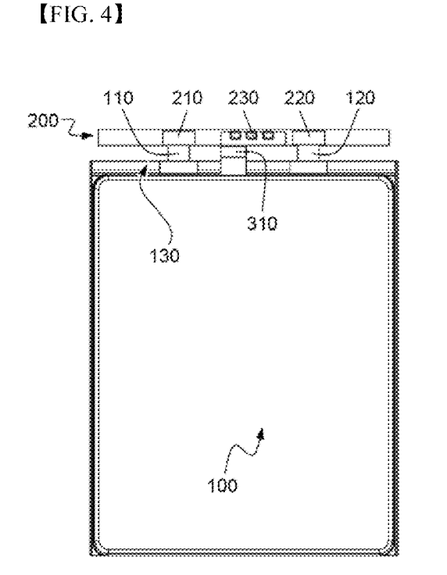

Referring to FIGS. 3 and 4, terminal joint parts 210 and 220 of a PCB 200 are electrically connected to electrode terminals 110 and 120 of a plate-shaped battery cell 100, respectively, by spot welding (see reference numerals 111 and 121).

After electric connection between the PCB 200 and the electrode terminals 110 and 120 is achieved, the terminal joint parts 210 and 220 of the PCB 200 are bent (see reference numeral 201) such that the terminal connection parts 210 and 220 of the PCB 200 are disposed in parallel to the top and the bottom of the plate-shaped battery cell 100.

Referring to FIG. 4, an external input and output terminal connection part 310 electrically connected to an external input and output terminal joint part 230 of the PCB 200 is directed downward as the result of bending of the terminal joint parts 210 and 220. In addition, a sealed surplus part 130 of the battery cell 100 is formed to have approximately the same width as the PCB 200.

Figure 5:
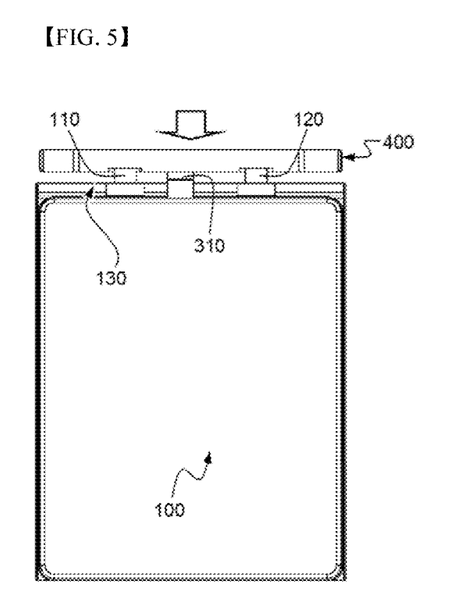
Figure 6:
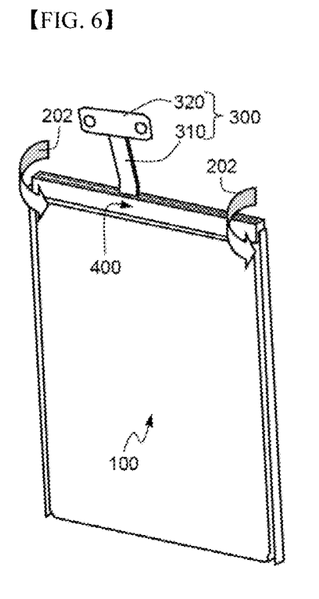
Figure 7:
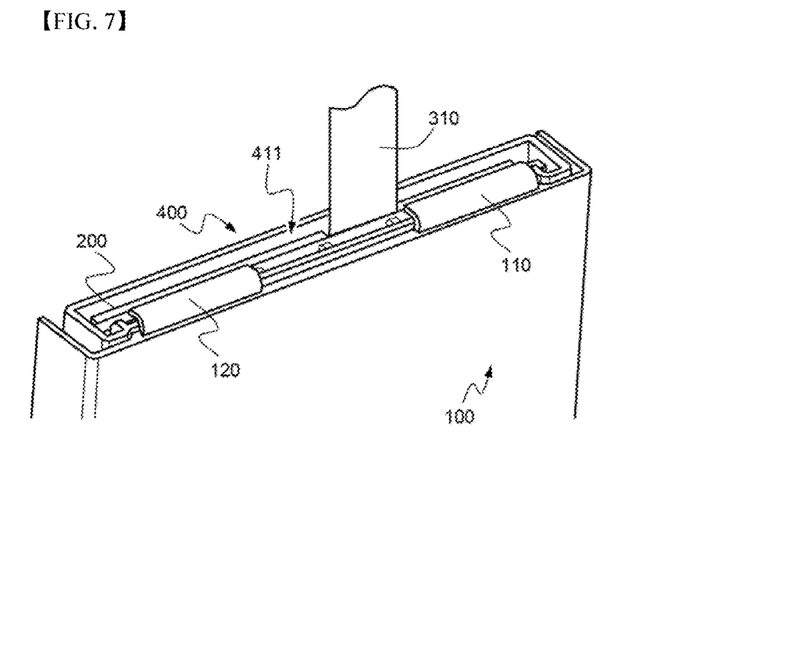

Referring to FIGS. 5 to 7, the PCB 200 is received in a module case 400 and then the module case 400 is loaded on the sealed surplus part 130 of the battery cell 100 by bending (see reference numerals 202) of the electrode terminals 110 and 120.

Specifically, referring to FIGS. 7 and 9, opposite end portions 431 of the module case 400 facing the sealed surplus part 130 of the battery cell 100 protrude toward the sealed surplus part 130 of the battery cell 100. The protruding length of each of the opposite end portions 431 of the module case 400 is equal to a protruding height of each electrode terminal sealing part formed at the sealed surplus part 130 of the battery cell 100. Consequently, the module case 400 with the above-stated construction may be stably loaded on the sealed surplus part 130 of the battery cell 100 in a state in which the module case 400 is in tighter contact with the sealed surplus part 130 of the battery cell 100.

Meanwhile, as shown in FIG. 6, an external input and output terminal 300 extending outward from the module case 400 is directed upward as the module case 400 is loaded on the sealed surplus part 130 of the battery cell 100.

At this time, the width and the length of the module case 400 loaded on the sealed surplus part 130 of the battery cell 100 are approximately equal to the width and the length of the sealed surplus part 130 of the battery cell 100.

In addition, the height of the module case 400 loaded on the sealed surplus part 130 of the battery cell 100 is equal to the thickness of the battery cell 100.

Specifically, as shown in FIG. 9, the module case 400 is configured to have a rectangular parallelepiped box structure, the outer surface of which is smooth and which has no additional member. In addition, a plurality of PCB fixing protrusion parts 421 is formed at the inside of the module case 400.

Consequently, the PCB 200 and a safety element (not shown) are securely and stably fixed by the PCB fixing protrusion parts 421 in a state in which the PCB 200 and the safety element are received in a PCB receiving part 420 of the module case 400 such that the PCB 200 and the safety element can be electrically isolated and protected from the outside.

As described above, the module case 400 is configured to have an assembly type fastening structure which does not require an additional fixing member or protection member. Consequently, productivity is improved through a simplified assembly process.

In addition, the outer surface of the module case 400 is smooth. As a result, the outer surface of the module case 400 may form a smooth outer surface of the battery pack and, therefore, the battery pack may be manufactured to have correct dimensions and, at the same time, the battery pack may provide a pleasing external appearance.

Furthermore, as shown in FIGS. 6 and 9, the module case 400 may be easily loaded on the sealed surplus part 130 of the battery cell 100 since the module case 400 has a rectangular parallelepiped box structure, the outer surface of which is smooth.

As a result, the battery pack according to the embodiment of the present invention has a more compact structure than a conventional battery pack. In addition, it is possible to utilize a space occupied by a PCM, a PCM fixing member, or PCM protection members of the conventional battery pack as a space for electrical capacity. Consequently, it is possible to increase electrical capacity of the battery pack.

Figure 8:
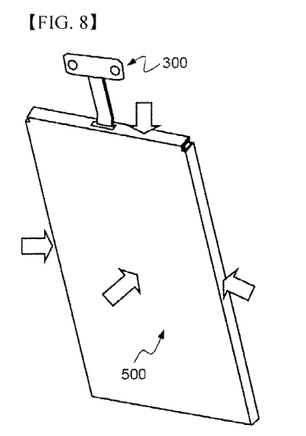

Referring to FIG. 8, the outer surface of the battery cell 100 and the outer surface of the module case 400 excluding the external input and output terminal 300 are wrapped by a protection label 500.

The label 500, which indicates product information, more stably secures electrical connection between the electrode terminals 110 and 120 of the battery cell 100 and the PCB 200 while maintaining insulation of the battery cell 100.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack configured to have a structure comprising:
   a plate-shaped battery cell having a battery case and electrode terminals formed at one side thereof, the battery case comprising a sealed surplus part, and the battery cell having a protection circuit module (PCM) mounted at the sealed surplus part, wherein
   each of the electrode terminals of the battery cell is made of a plate-shaped conductive member,
   the PCM comprises a protection circuit board (PCB), a safety element electrically connected between one of the electrode terminals formed at one side of the battery cell and the PCB or loaded on the PCB, an external input and output terminal electrically connected to a protection circuit of the PCB, and an electrically insulative module case in which the PCB and the safety element are mounted in a state in which the external input and output terminal extends outside,
   the module case has a first open end and a second open end to define a tunnel structure, the first open end and the second open end being opposite each other,
   the module case is provided at an interior thereof with a PCB receiving part,
   the PCM is loaded on the sealed surplus part of the battery cell in a state in which the PCM is received in the module case such that the PCM is electrically connected to the electrode terminals of the battery cell, and
   the first open end and the second open end communicate with each other in a straight line, and the first open end or the second open end is oriented toward the electrode assembly of the battery cell in a state in which the module case is loaded on the sealed surplus part of the battery cell.

2. The battery pack according to claim 1, wherein the plate-shaped battery cell is a pouch-shaped secondary battery having an electrode assembly received in the battery case, the battery case being made of a laminate sheet comprising a resin layer and a metal layer in a sealed state.

3. The battery pack according to claim 2, wherein the electrode assembly is configured to have a structure comprising a cathode, an anode, and a separator disposed between the cathode and the anode and is received in the battery case together with an electrolyte in a sealed state.

4. The battery pack according to claim 1, wherein the sealed surplus part is an upper end sealed part formed when a battery case is thermally bonded in a sealed state.

5. The battery pack according to claim 1, wherein the safety element comprises at least one selected from a group consisting of a positive temperature coefficient (PTC) element, a fuse, and a thermal cutoff or cutout (TCO).

6. The battery pack according to claim 1, wherein the external input and output terminal is configured in the form of a plate or a wire.

7. The battery pack according to claim 1, wherein opposite end portions of one side wall of the module case facing the sealed surplus part of the battery cell protrude more toward the sealed surplus part of the battery cell than a middle portion of the one side wall.

8. The battery pack according to claim 1, wherein the module case is configured to have a rectangular parallelepiped box structure.

9. The battery pack according to claim 8, wherein the module case is provided at an inside thereof with at least one PCB fixing protrusion part.

10. The battery pack according to claim 1, further comprising a label attached to outer surfaces of the PCM and the battery cell excluding the external input and output terminal in a wrapping fashion.

11. A protection circuit module (PCM) loaded on a sealed surplus part of a plate-shaped battery cell having electrode terminals, each of which is made of a plate-shaped conductive member, formed at an upper end thereof, wherein
   the PCM comprises a PCB, a safety element electrically connected between one of the electrode terminals formed at one side of the battery cell and the PCB or loaded on the PCB, an external input and output terminal electrically connected to a protection circuit of the PCB, and an electrically insulative module case in which the PCB and the safety element are mounted in a state in which the external input and output terminal extends outside,
   the module case has a first open end and a second open end to define a tunnel structure, the first open end and second open end being opposite each other,
   the module case is provided at an interior thereof with a PCB receiving part,
   the PCM is loaded on the sealed surplus part of the battery cell in a state in which the PCM is received in the module case such that the PCM is electrically connected to the electrode terminals of the battery cell, and
   the first open end and the second open end communicate with each other in a straight line and the first open end or the second open end is oriented toward the electrode assembly of the battery cell in a state in which the module case is loaded on the sealed surplus part of the battery cell.

12. A method of manufacturing a battery pack according to claim 1, the method comprising:
   (a) connecting an external input and output terminal to the PCB by welding or soldering;
   (b) connecting the PCB to electrode terminals of the battery cell by welding or soldering;

(c) mounting the PCB in the PCB receiving part of the module case through the first open end and the second open end of the module case;

(d) loading the PCM on the sealed surplus part of the battery cell; and (e) attaching a label to outer surfaces of the PCM and the battery cell excluding the external input and output terminal in a wrapping fashion.

13. The method according to claim 12, wherein the welding is spot welding, laser welding, or ultrasonic welding.

14. A mobile device comprising a battery pack according to claim 1 as a power source.

15. The mobile device according to claim 14, wherein the mobile device is a mobile phone, a laptop computer, a netbook computer, a tablet PC, or a smart pad.

16. The battery pack according to claim 1, wherein each of the electrode terminals extends through the first open end and the second open end.

\* \* \* \* \*